(12) United States Patent
Haddad et al.

(10) Patent No.: US 6,468,570 B1
(45) Date of Patent: Oct. 22, 2002

(54) METHODS AND APPARATUS FOR MAKING PRECISE WEIGHT CHEESE PRODUCTS

(75) Inventors: Nabil Habib Haddad; Jean-Denis Bedard, both of Brossard (CA)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 09/952,746

(22) Filed: Sep. 14, 2001

(51) Int. Cl.[7] .......................... A23C 19/00; B28B 17/00
(52) U.S. Cl. .......................... 426/231; 99/456; 99/458; 425/140; 426/582
(58) Field of Search .................... 426/231, 512, 426/582; 99/456, 458; 425/135, 140

(56) References Cited

U.S. PATENT DOCUMENTS

| | | |
|---|---|---|
| 550,193 A | 11/1895 | Pruthers |
| 2,182,408 A | 12/1939 | Phillips et al. |
| 3,078,170 A | 2/1963 | Leber |
| 4,061,794 A | 12/1977 | Charles |
| 4,152,101 A | 5/1979 | Charles |
| 4,539,902 A * | 9/1985 | Brockwell et al. ............ 99/456 |
| 4,879,946 A | 11/1989 | Blodgett et al. |
| 4,942,052 A | 7/1990 | Posdal |
| 5,146,845 A | 9/1992 | Pittelko |
| 5,209,943 A | 5/1993 | Pittelko |
| 5,220,969 A | 6/1993 | DeBarber et al. |
| 5,243,900 A | 9/1993 | Pittelko |
| 5,408,054 A | 4/1995 | Brandorff et al. |
| 5,513,559 A | 5/1996 | Jay |
| 5,606,907 A | 3/1997 | Jay |
| 5,723,825 A | 3/1998 | Dolan et al. |
| 5,749,204 A | 5/1998 | Bokelmann et al. |
| 5,985,347 A | 11/1999 | Ejnik |
| 6,180,153 B1 * | 1/2001 | Palus et al. ................ 426/582 |

FOREIGN PATENT DOCUMENTS

WO      WO 00/51418      9/2000

* cited by examiner

*Primary Examiner*—George C. Yeung
(74) *Attorney, Agent, or Firm*—Fitch, Even, Tabin & Flannery

(57) ABSTRACT

A cheese tower system is adapted for producing precise weight quantities of cheese. In an embodiment of the invention, a column of cheese is formed using a tower. Retail portions of cheese may be cut from the cheese column. The cut portions of cheese may be weighed to determined whether they are within a desired range of weight. If the cheese weights are outside of the range of preferred weights, then the size of subsequent quantities of cheese may be adjusted to change their weights to within acceptable limits.

20 Claims, 5 Drawing Sheets

METHODS AND APPARATUS FOR MAKING PRECISE WEIGHT CHEESE PRODUCTS

FIELD OF THE INVENTION

The invention relates generally to retail cheese products, and particularly to methods and apparatus for producing retail cheese products of controlled weight.

BACKGROUND OF THE INVENTION

In the manufacture of bulk cheese products, large blocks of cheese, nominally weighing, e.g., 40 lbs., 240 lbs., or 640 lbs., may be formed using a tower system. Tower systems can allow for the introduction of cheese curds and whey into the top of the tower, the extraction of the liquid whey from the cheese curds, and finally the withdrawal of solid cheese from the bottom of the tower. Guillotine blades may operate to sever the cheese into blocks as it emerges from the bottom of the tower.

Such large blocks or barrels of cheese generally are not of precise weight, and are generally not intended for retail sale. Instead, the large blocks typically are divided into smaller chunks, slices, or other portions.

When packaged for retail sale, the weight of the product must be accurately set forth on a label. Random weight products are produced without precise control of the weight of the product, then weighed and sold at a price dependent upon the weight. Exact weight products, on the other hand, are made within close tolerances so that they may be produced at a weight of e.g., 605 gm ±5 gm, and labeled with a predetermined "exact" weight, e.g., 600 gm, rather than having to be labeled with different "random" weights. Production of exact weight products greatly simplifies packaging, labeling, and pricing.

In the past, manufacture of exact weight natural cheese products for retail sale typically has entailed generation of substantial quantities of trim or offcuts having reduced value. For example, dividing a 640 lbs. barrel of cheese into retail portions may result in 18 to 24 percent trim or offcuts. Thus, there has been a need for an improved method of producing exact weight natural cheese products.

Production in cheese towers generally has not been compatible with exact weight cheese production.

Pittelko, U.S. Pat. No. 5,209,943, discloses a tower with a discharge port in communication with a cheese receiving station. A pair of guillotine knife blades are disposed in communication with the discharge chamber at the base of the tower and form the support for the column of cheese as the tower is filled. After a predetermined amount of cheese has been deposited on the cheese receiving station, the guillotine blades operate to sever the cheese emerging from the tower into large blocks of cheese. However, the '943 patent does not disclose methods or apparatus for making exact weight cheese products.

U.S. Pat. No. 5,243,900, also to Pittelko, discloses a cheese transfer system for receiving a column of cheese emerging from a cheese tower. The lower end of the cheese tower includes a chamber for maintaining the shape of a large cheese block cut from the column of cheese and introducing the large cheese block into a shipping container. A cheese platform assembly is provided beneath the chamber for guiding the column of cheese downward as the column emerges from the cheese tower. However, there is no disclosure in the '900 patent of methods or apparatus for making precise weight cheese products.

SUMMARY OF THE INVENTION

In accordance with the invention, methods and apparatus are provided for producing portions of cheese products having precise weight using a tower system. As the cheese emerges from the tower, the cheese is cut into one or more consumer size quantities. The cut cheese quantity is then weighed, and the weight information is used to adjust the size of one or more subsequent quantities of cheese to be cut from the cheese emerging from the tower.

According to an embodiment of the invention, cheese curds and whey are placed into the top of a vertically-oriented cheese tower. The mixture is inserted into one or more forming tubes disposed within the tower and extending parallel to the longitudinal axis of the cheese tower. The forming tubes may be of rectangular, circular or other cross-section. The tubes have multiple perforations along their lengths to allow the liquid whey to be drawn out from the mixture by a vacuum, thereby forming a substantially solid column of cheese. In order to withdraw the liquid whey from the mixture, the tower may be sealed and its interior maintained at subatmospheric pressure.

A blade mechanism is provided at the lower end of the cheese tower for severing an end portion of the column of cheese. The blade mechanism may include a guillotine blade that is slidable between an extended position and a retracted position. In the extended position, the blade may be positioned to support the column of cheese. The extended blade may also function to seal the bottom end of the cheese tower. In the retracted position, the blade is positioned to the side of the cheese tower, allowing the cheese column previously supported thereby to move downward under the influence of gravity.

A pneumatic cylinder or other mechanism may be employed to move the blade back and forth, whereby a leading edge of the blade repeatedly severs the end of the cheese column to produce cut quantities of cheese.

A sizing gate mechanism may be positioned at or beneath the bottom opening of the cheese tower and below the blade mechanism. The sizing gate mechanism may include a sizing gate for supporting the cheese column prior to cutting, and subsequently supporting the cut quantity of cheese. Similar to the blade, the sizing gate is translatable between a retracted and extended position. When in its extended position, the sizing gate is preferably positioned to support the column of cheese when the blade is in its retracted position. When the blade moves to its extended position and severs the bottom end of the cheese column, one or more cut quantities of cheese remain on the sizing gate. While the column of cheese is supported by the blade, the sizing gate may be moved to its retracted position, allowing the quantity of cheese to move downward.

The vertical location of the sizing gate relative to the cheese tower may be changed using an adjustment mechanism. Changing the elevation of the sizing gate with respect to the cheese tower changes the spacing between the blade and the sizing gate, which corresponds to the height of the quantity of cheese to be cut from the cheese column. Accordingly, raising or lowering the sizing gate changes the size of the quantity of cheese to be cut from the cheese column.

A receiving conveyor may be disposed below the sizing gate and positioned beneath the bottom end of the cheese tower for receiving cut quantities of cheese when the sizing gate retracts. The conveyor may comprise a plurality of belts wrapped around two or more spindles. The conveyor belts and spindles may be configured to translate vertically between upper and lower positions with respect to a conveyor base that supports the belts and spindles.

A scale assembly is preferably disposed beneath the conveyor when the conveyor is in the upper position. The scale assembly comprises a scale support and a weighing grid. The weighing grid comprises multiple upwardly extending scale fingers. When the conveyor is in the upper position, the scale fingers of the intermeshing weighing grid are positioned below the top surface of the conveyor belts. However, when the conveyor is in the lower position, the scale fingers extend between and above the top surface of the conveyor belts for supporting cheese previously supported by the belts. The weight of the cheese then be measured by the scale.

The weight of the quantity of cheese may then be compared to a predetermined desired weight or range of weights to determine whether the cut cheese is within desired weight parameters. If the cut cheese weighs too much, the adjustment mechanism raises the sizing gate, thereby reducing the vertical dimension of subsequent quantities to be cut from the column. Conversely, if the cut portion weighs too little, the adjustment mechanism can lower the sizing gate to increase the vertical dimension and thus the weight of subsequent quantities.

In an embodiment of the invention, the conveyor moves to an intermediate position between the lower position and the upper position after the cheese has been weighed. The intermediate position may be aligned with a downstream conveyor to allow the conveyor to move the quantity of cheese to the downstream conveyor for direction to any subsequent operating stations. After discharging the quantity of cheese, the conveyor may return to its upper position to receive the next quantity of cheese to be cut.

DETAILED DESCRIPTION OF PREFERRED EMBODIMENTS

Figure 1:
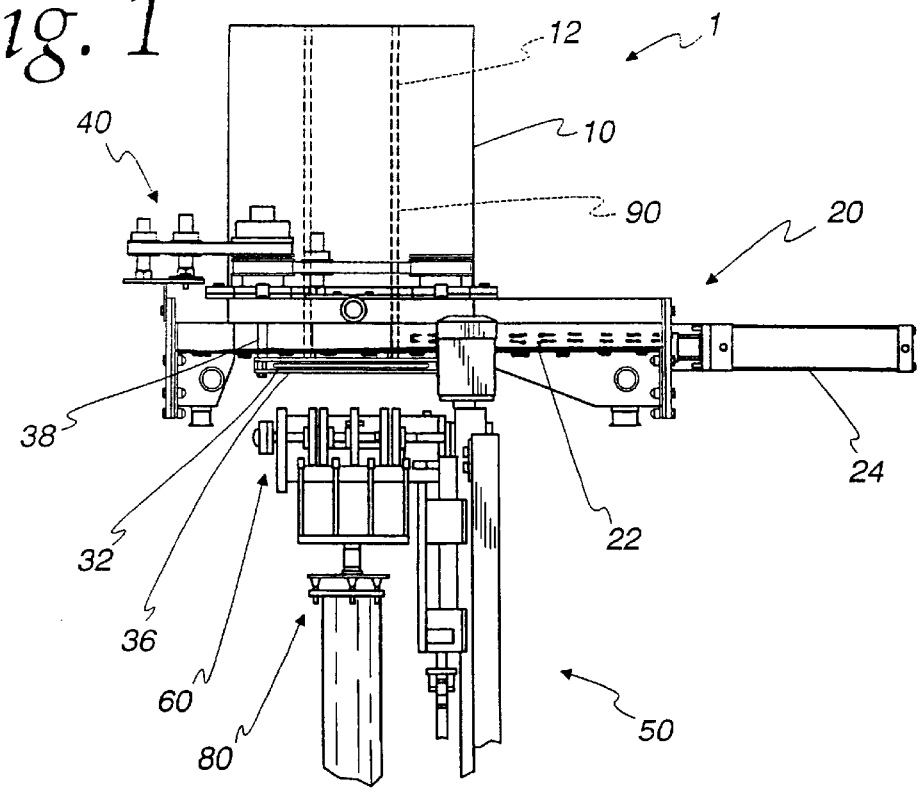
FIG. 1 is a front elevation view of a cheese tower system showing a sizing gate in an extended position, a blade in a retracted position, a cheese column resting on the sizing gate, and a conveyor weighing apparatus in accordance with an embodiment of the invention.

The invention is preferably embodied in methods and apparatus for producing consumer size portions of cheese 92 having substantially precise weights. A mixture of cheese curds and whey is formed into a substantially solid column of cheese 90 using a cheese tower 10. As the cheese column 90 emerges from the tower 10 quantities of cheese 92 are cut therefrom. The weight of each of the cut quantities of cheese 92 is compared to a range of desirable cheese weights. The size of future quantities of cheese 92 are adjusted if the previously cut quantities of cheese are outside of the range of desirable cheese weights. A preferred embodiment of the invention, where a column of cheese 90 is formed in a cheese tower 10 and a quantity of cheese 92 is cut from the column of cheese 90 and weighed to determine whether the size of subsequent quantities of cheese 92 should be changed, is disclosed below.

FIGS. 1–8 illustrate a cheese tower system 1 according to an embodiment of the invention. The system 1 includes a cheese tower 10 for forming a cheese column 90. A guillotine blade 22 is positioned below a bottom opening of the cheese tower 10 for cutting quantities of cheese 92 from the cheese column 90. Positioned below the blade 22 is a sizing gate 32 for controlling the size of the quantity of cheese 92 to be cut from the cheese column 90. A conveyor weighing apparatus 50 is placed below the cheese tower 10 to receive the quantities of cheese 92 cut by the blade 22. The conveyor weighing apparatus 50 includes a scale 80 for weighing the cut quantities of cheese 92. The weight of the cut quantities of cheese 92 is used to determine the need for adjustments to the spacing between the blade 22 and the sizing gate 32 to adjust the size of subsequent quantities of cheese 92 to be cut from the cheese column 90.

As illustrated in FIG. 1, the cheese tower 10 comprises a vertically-oriented tower for forming cheese therein. A combination of cheese curds and whey are fed into the top of the tower and placed into a vertically-oriented forming tube 12. The forming tube 22 has a cross-sectional profile corresponding to the desired profile for the cut quantities of cheese 92. To form the cheese curds and whey into substantially solid cheese, the cheese tower 10 is drawn under a vacuum. Perforations formed in the forming tubes 22 allow liquid whey to be drawn away from the cheese curds by the vacuum, resulting in the tube 22 having a column of solid cheese 90 therein. During the cheese forming process, a portion of the column of cheese 90 toward the bottom of the tower 10 is compressed by the weight of the cheese column 90 thereabove. Accordingly, the portion of the cheese 90 towards the bottom of the tower has a greater density. In one particular embodiment of the invention, the cheese tower 10 may comprise a modified version of a commercially available cheese tower, such as manufactured by Damrow Company, Incorporated, of Fond du Lac, Wis. In an embodiment of the invention, the cheese tower 10 is 12 to 14 feet high.

Figure 2:
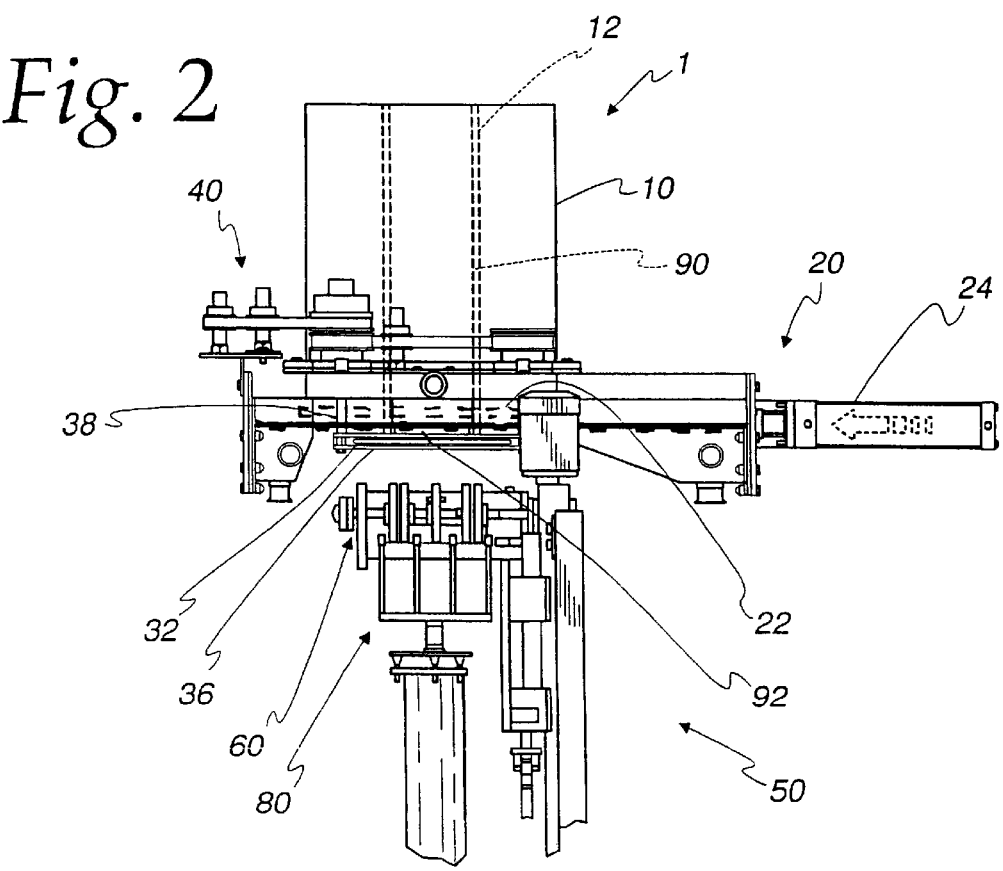
FIG. 2 is a front elevation view of the cheese tower system of FIG. 1 showing the sizing gate in the extended position, the blade in its cutting position, and a cut quantity of cheese on the sizing gate.
Figure 3:
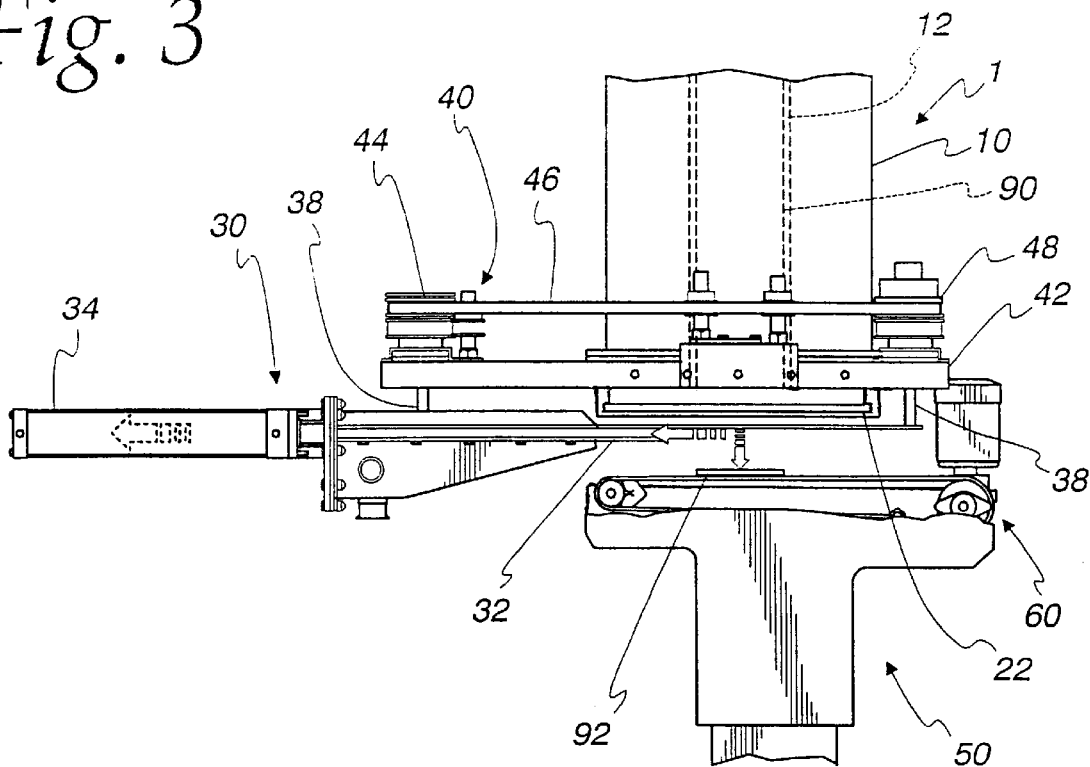
FIG. 3 is a side elevation view of the cheese tower system of FIG. 1 showing the sizing gate moving to a retracted position and the quantity of cheese on the conveyor weighing apparatus.
Figure 4:
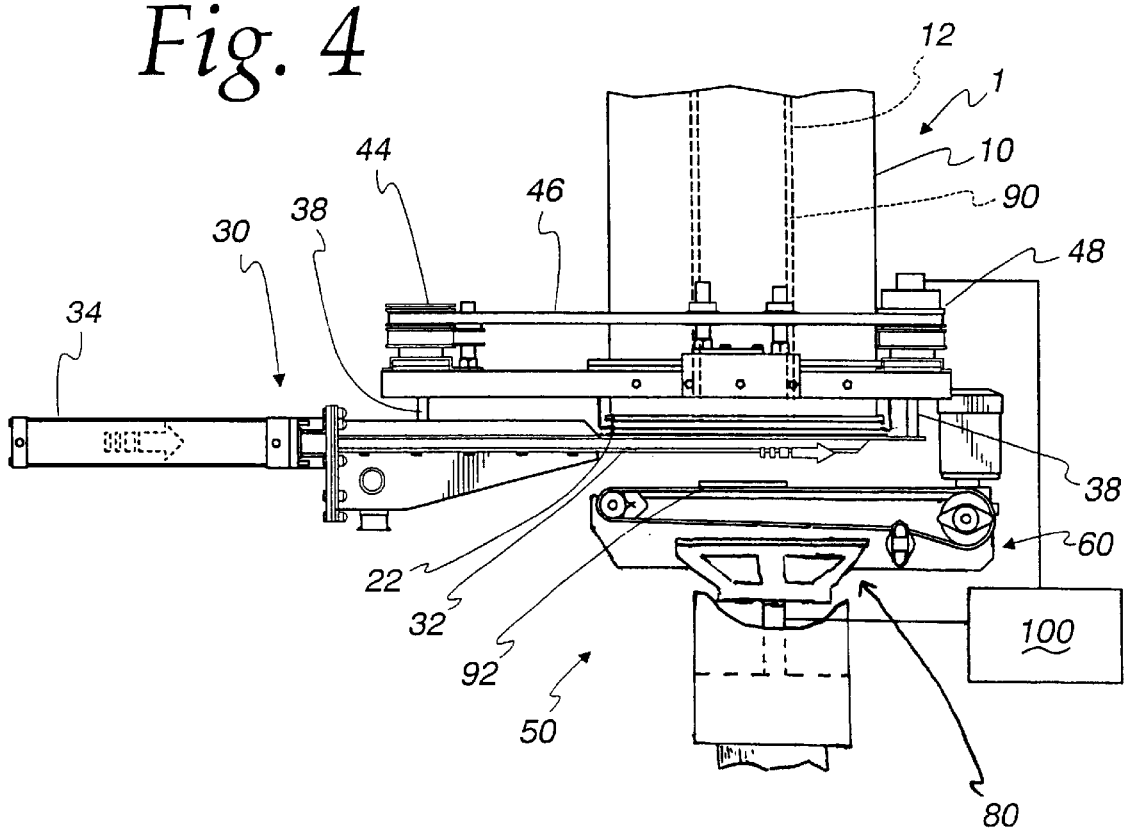
FIG. 4 is a side elevation view of the cheese tower of FIG. 1 showing the sizing gate moving to the extended position.

Disposed at the bottom end of the cheese tower 10 is a guillotine blade mechanism 20 for both supporting the column of cheese 90 in the tube 12 and sealing the bottom end of the cheese tower 10. The guillotine blade mechanism 20 includes the horizontally oriented guillotine blade 22 adapted for movement between an extended position and a retracted position by urging of a pneumatic cylinder 24, or other suitable device. In the extended position, the blade 22 is positioned directly beneath the bottom end of the cheese tower 10 for supporting the column of cheese 90, as illustrated in FIG. 2. The blade 22 also seals the bottom end of the tower 10 to allow the vacuum to be drawn. When in the retracted position, illustrated in FIG. 1, the blade 22 is positioned to allow the bottom of the column of cheese 90 inside the cheese tower 10 to descend part the blade 22.

When the guillotine blade 22 is in the retracted position, the cheese column 90 may descend onto the sizing gate 32. The sizing gate 32 is positioned below both the cheese tower 10 and the guillotine blade 22, and is part of the sizing gate mechanism 30 for adjusting the size of the quantities of cheese 92 cut from the cheese column 90. The horizontally oriented sizing gate 32 is slidable between an extended position and a retracted position by urging of a pneumatic cylinder 34, or other suitable devices. When the sizing gate 32 is in the extended position, illustrated in FIG. 4, the sizing gate 32 is positioned to support the column of cheese 90 emerging from the cheese tower 10 and no longer supported by the guillotine blade 22. Once the column of cheese 90 is on the sizing gate 32, the blade 22 can return to its extended position, whereby the blade 22 cuts a quantity of cheese 92 from the cheese column 90.

The sizing gate 32 is slidable relative to a sizing gate frame 36 that supports the sizing gate 32. The sizing gate frame 36, and thus the sizing gate 32, can be raised and lowered relative to the cheese tower 10 and blade 22 with an adjustment mechanism 40. The sizing gate frame 36 has four upwardly extending threaded adjustment rods 38 that are received in female threaded rod adjusters 44 attached to the top of a support plate 42 fixed proximate the lower end of the cheese tower 10. The threaded screw type rod adjusters 44 are synchronized with belts 46 and pulleys 48 to a common drive motor. The drive motor is selectively activatable to raise and lower the sizing gate frame 36 by turning the pulleys 48 via the belts 46 to adjust the vertical position of the adjustment rods 38 within the rod adjusters 44. In this manner, the vertical spacing of the sizing gate 32 with respect to the guillotine blade 22 can be increased or decreased, thereby increasing or decreasing the thickness of the quantity of cheese 92 to be cut from the cheese column 90 and thus the weight of the cut quantity of cheese 92. According to another embodiment of the invention, four individual servo motors may be used to raise and lower the adjustment rods 38 of the sizing gate frame 36. The four individual motors would be electronically controlled and synchronized to eliminate the need for the pulleys 48 and belts 46.

Once the quantity of cheese 92 has been cut from the column of cheese 90 by the blade 22, the quantity of cheese 92 remains on the sizing gate 32, which is still disposed in its extended position. The cutting blade 22, fully returned to its extended position, is once again supporting the column of cheese 90 within the tube 12 of the cheese tower 10. The sizing gate 32 can then be moved to its retracted position, illustrated in FIG. 3, causing the cut quantity of cheese 92 to fall to a conveyor weighing apparatus 50 positioned therebelow.

As illustrated in FIGS. 5–8, the conveyor weighing apparatus 50 includes a conveyor 60 with a scale assembly 80 positioned therebelow. The conveyor 60 comprises a plurality of sheaves 62 disposed on a pair of spindles 68, with o-rings or belts 64 extending between aligned sheaves 62 on the respective spindles 38. The conveyor 60 is mounted to a conveyor bracket plate 72 that is vertically translatable with respect to a conveyor frame 70 of the conveyor apparatus 50, thus allowing the conveyor belts 64 to be raised and lowered relative to the conveyor frame 70. A three position pneumatic cylinder 74, or other suitable device, is positioned between the conveyor bracket plate 72 and the conveyor frame 70 for moving the conveyor 60 between the upper, intermediate, and lower positions.

Figure 5:
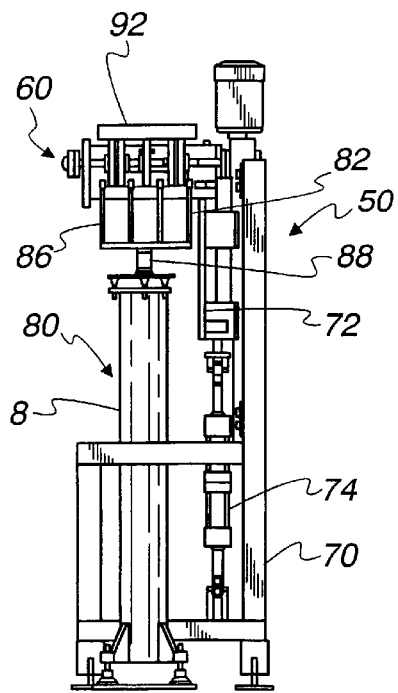
FIG. 5 is front elevation view of the conveyor weighing apparatus of FIG. 1 showing a conveyor in an upper position.
Figure 7:
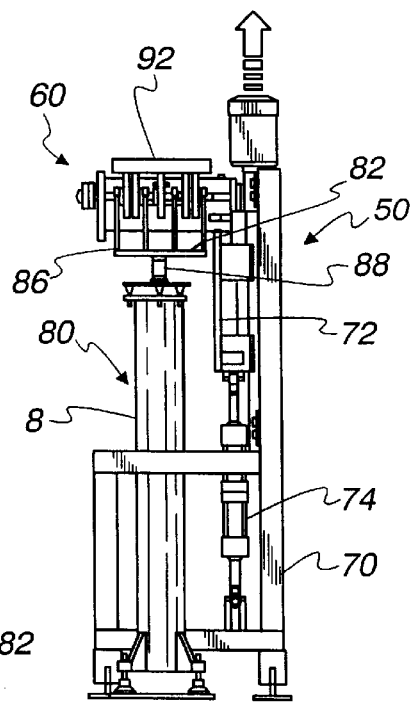
FIG. 7 is front elevation view of the conveyor of FIG. 1 showing the conveyor moving to an intermediate position.
Figure 6:
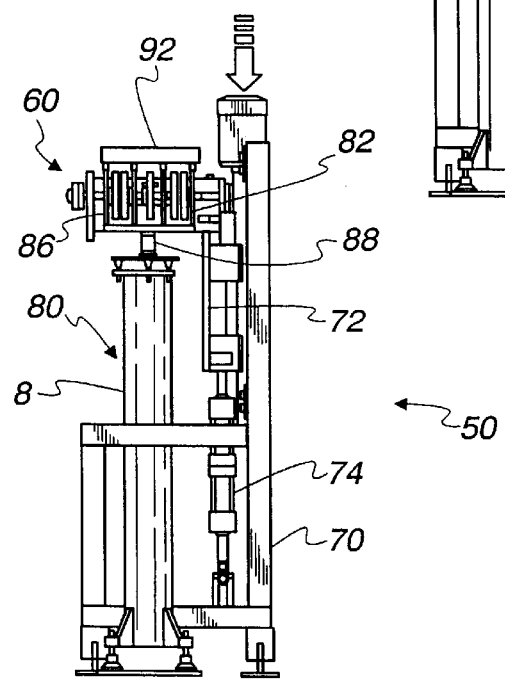
FIG. 6 is front elevation view of the conveyor of FIG. 1 showing the conveyor moving to a lower position.
Figure 8:
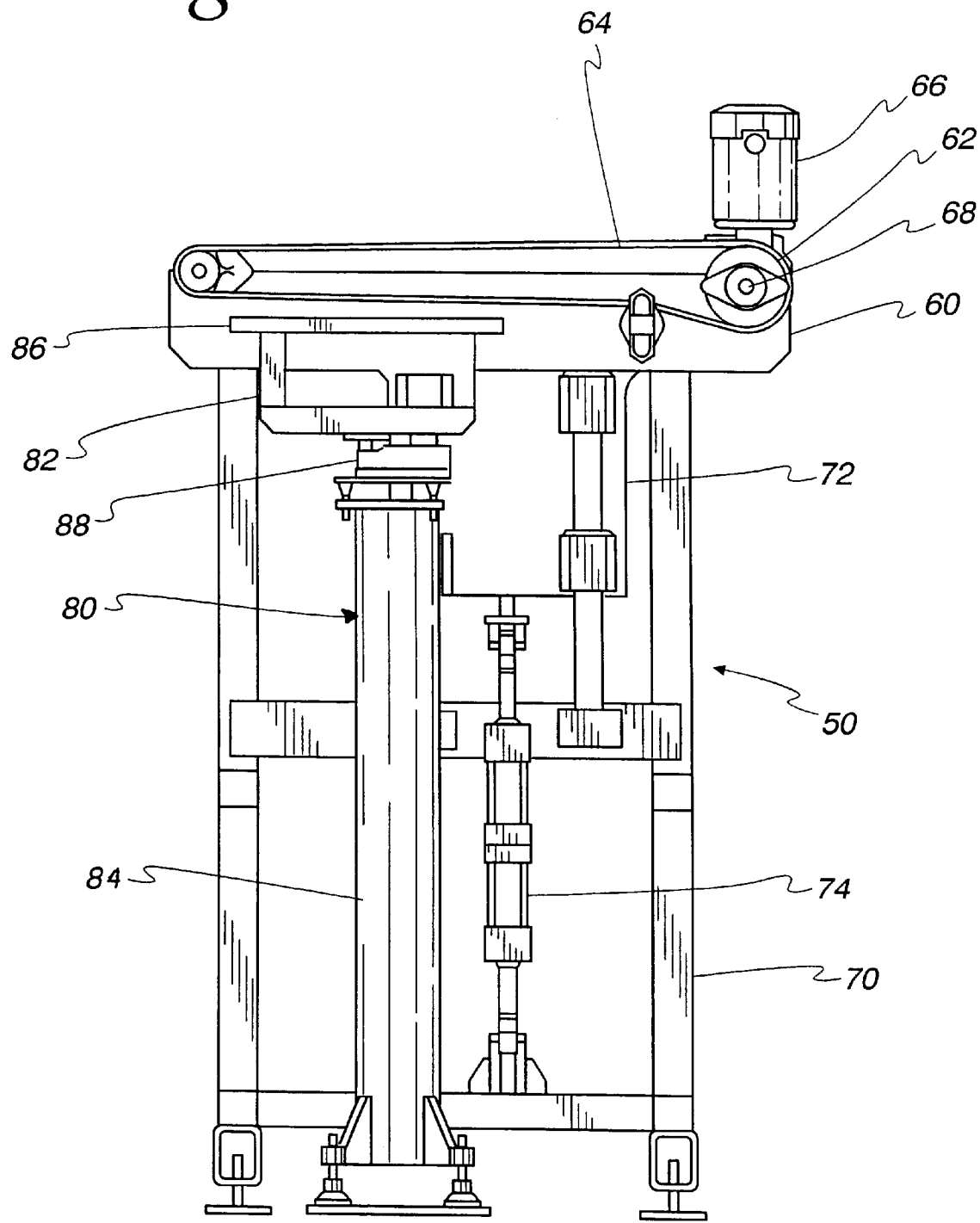
FIG. 8 is a side elevation view of the conveyor weighing apparatus of FIG. 1.

The scale assembly 80 disposed beneath the conveyor 60 is positioned to weigh the quantity of cheese 92. The scale assembly 60 includes a weighing grid 82 comprised of a plurality of upwardly extending grid fingers 86, as illustrated in FIGS. 5–7. Positioned between the weighing grid 82 and a support column 84 is a load cell 88 for measuring the weight of quantities of cheese 92 when supported by the weighing fingers 86.

When the sliding gate 32 retracts, thereby dropping the cut quantity of cheese 92 onto the belts 64 of the conveyor 60, the conveyor 60 is preferably in its upper position. When in its upper position, the grid fingers 86 are disposed below the top surface of the conveyor belts 64, as illustrated in FIG. 5. To weigh the quantities of cheese 92 on the conveyor belts 64, the conveyor 60 is moved to its lowered position, allowing the fingers 86 of the weighing grid 82 to extend upwardly from between the belts 64 and support the quantity of cheese 92, as illustrated in FIG. 6. By supporting the cut quantities of cheese 92 with the weighing grid 82, precise weights of the cheese quantities 92 can be obtained with the load cell 88.

After weighing the cut quantity of cheese 92, the conveyor 50 is raised to an intermediate position between the upper and lower positions, as illustrated in FIG. 7, for discharging the cheese 92 to another conveyor for directing the cheese 92 to subsequent operation stations. For example, the cheese 92 may be directed to an automated packaging station, where the cut quantities of cheese 92 are individually wrapped and labeled.

The weight of the quantity of cheese 92 obtained using the scale assembly 80 is compared using a processor 100 to a range of predetermined ideal weights for the cheese 92. If the weight of the cut quantity of cheese 92 deviates from the desired weight range, the processor 100 can automatically change the size of subsequent quantities of cheese 92 to be cut from the column of cheese 90 by changing the vertical position of the sizing gate 32 with respect to the guillotine blade 22.

For example, if the weight of the portion 92 is lower than the range of weights, the sizing gate 32 is lowered to increase the size of subsequent cheese portions 92. If the weight of the portion 92 is higher than the range of weights, the sizing gate 32 is raised to decrease the size of subsequent quantities of cheese 92. If the portion of cheese 92 is within the weight range, then no adjustments are made to the position of the sizing gate 32. The processor 100 may also be configured to reject portions of cheese 92 that are significantly outside the desired weight range so that the sizing gate 32 will not be misadjusted based upon abnormal portion weights. For instance, if a cheese portion 92 weighs 50 gm more than the desired weight, the portion of cheese 92 will be rejected, and its weight will not be used to adjust the size of subsequent quantities of cheese 92.

The processor 100 controls the activation of the sizing gate adjustment motor to raise or lower the sizing gate frame 36 with the adjustment rods 38 and rod adjusters 44. In an embodiment of the invention, the processor 100 controls the position of the sizing gate 32 by actuating the common drive motor for the adjustment mechanism 40 for a predetermined time interval. For example, if the cheese block is 1 gm underweight, then the motor may be actuated for 2 seconds to lower the sizing gate.

The processor 100 can be adjusted for producing cheese portions of different weights. For example, the processor 100 may be configured to produce 600 gm portions of cheese. In such a case, the typical deviation from the desired weight of the cheese portion may be plus or minus 5 gm. Thus, when producing portions of cheese for labeling with a weight of 600 gm, it is desirable to attempt to produce cheese portions having an average weight of 605 gm to ensure that even when at the lower end of the deviation the portions weigh equal to or more than the labeled weight.

In the above-described cheese tower system 1, the cheese tower 10 includes one forming tube 12. However, more than one forming tube 12 may be included within the cheese tower 10 to enable the system to increase its production of cut cheese portions 92. For example, two forming tubes 12 may be disposed within the tower 10. When two forming tubes 12 are used, each time the guillotine blade 22 moves from its retracted to extended position for cutting, two portions of cheese 92 are cut, i.e., one from each cheese column 90.

Figure 9:
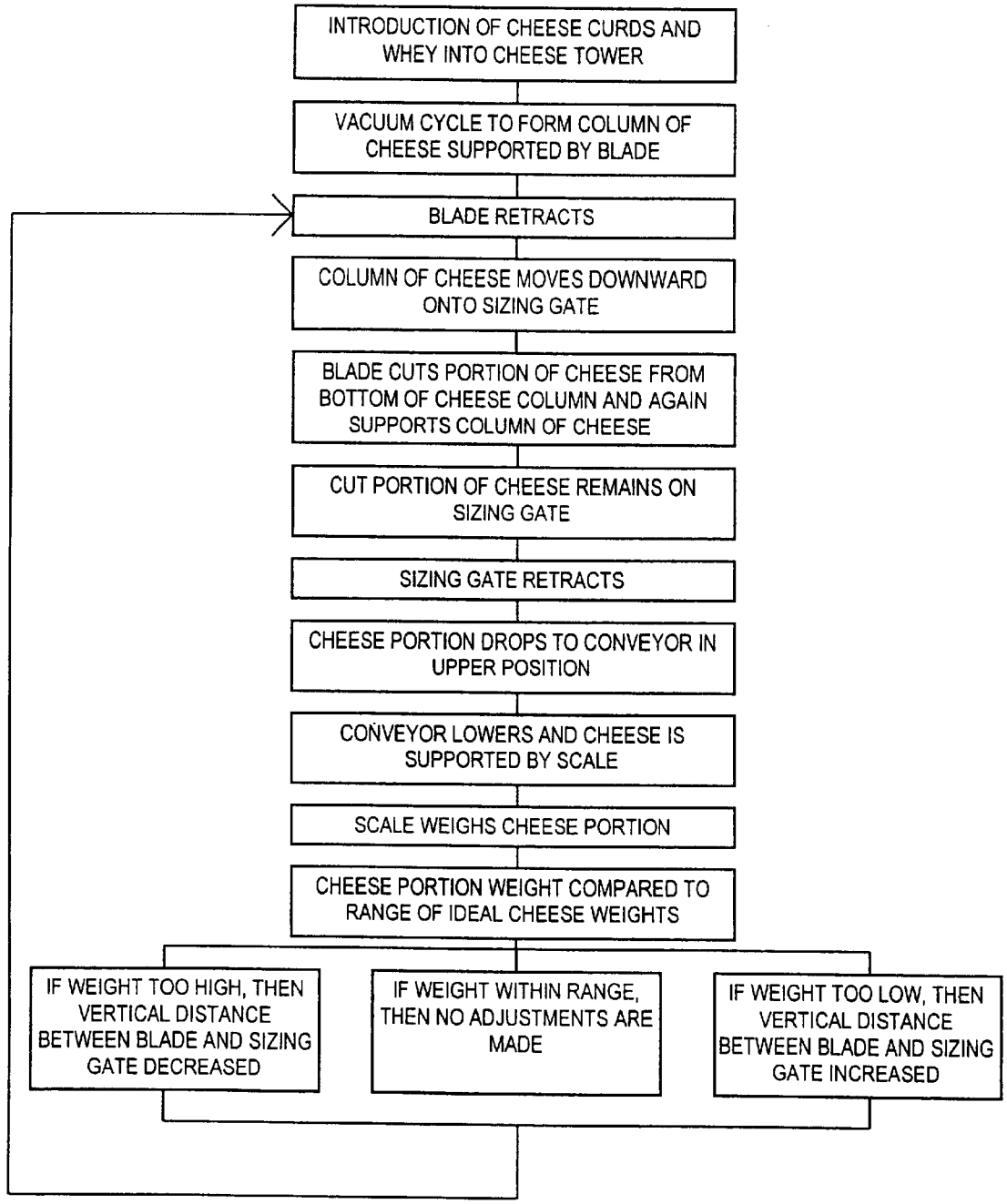
FIG. 9 is a flow chart illustrating steps for forming precise weight portions of cheese in accordance with an embodiment of the method of the invention.

According to a method of the invention, illustrated in the flow chart of FIG. 9, the cheese curds and whey are fed into the top of the cheese tower 10 and inserted into the forming tube 12. The bottom of the cheese tower 10 is sealed by the guillotine blade 22 in its extended position, allowing the cheese tower 10 to be drawn under subatmospheric pressure to remove the liquid whey from the combination of whey and cheese curds within the forming tube 12. After the vacuum cycle, the guillotine blade 22 moves to its retracted position, allowing the cheese column 90 formed in the cheese tower 10 to fall onto the retractable sizing gate 32 in its extended position. The guillotine blade 22 then returns to its extended position, severing the bottom end of the cheese column 90 to deposit a cut quantity of cheese 92 onto the sizing gate 32. The sizing gate 32 is then retracted, allowing the cut portion of cheese 92 to fall onto the conveyor belts 64 of the conveyor 60 in its upper position.

Next, the conveyor 60 is moved to its lowered position, allowing the cut quantity of cheese 92 to be fully supported by the fingers 86 of the weighing grid 82 for determining its weight. This weight is then compared to the range of predetermined ideal weights. If the weight of the cut quantity of cheese 92 is within the ideal weight range, then no adjustments are made to the relative spacing between the sizing gate 32 and the cutting blade 22 and the cutting process is repeated. However, if the weight of the cut quantity of cheese 92 is lower than the range of ideal weights, then the adjustment mechanism 40 moves the sizing gate 32 a greater distance below the cutting blade 22 to increase the thickness and thus the weight of the next quantity of cheese 92 to be cut from the column of cheese 90. If the weight of the cut quantity of cheese 92 is greater than the range of ideal cheese weights, the adjustment mechanism 40 can raise the sizing gate 32 to decrease the distance between the sizing gate 32 and the cutting blade 22, causing future quantities of cheese 92 cut from the cheese column 10 to have a lesser thickness and thus a lower weight. In this manner, the cheese tower system 1 continually checks the weights of the cheese quantities cut 92 from the bottom end of the column of cheese 90 and, if necessary, adjusts the size of future quantities of cheese 92 to ensure substantially precise weight portions of cheese 92 are produced for distribution to consumers.

In an embodiment of the invention, the cheese tower system 1 includes two forming tubes 12 within the tower 10 and is capable of producing up to twenty 600 gm portions of cheese 92 during a typical two minute cheese forming cycle. The cycle begins when the cheese tower 10 is filled with the curd and whey mixture. Next, the vacuum is drawn within the cheese tower 10, sealed at the bottom end by the blade 22 in its extended position. Drawing the vacuum takes about 15 seconds, after which the cheese tower 10 is held under vacuum for about 30 seconds. After the vacuum portion of the cycle, the cutting blade 22 makes ten cuts, each time slicing off a 600 gm portion of cheese 92 from each of the pair of cheese columns 90. During the slicing process, the sizing gate 32 and guillotine blade 22 function in the manner described above to ensure that the weights of the cheese portions 92 remain within acceptable limits. The cuts made by the blade 22 occur in about 85 seconds. During the cutting process, additional whey and cheese curd mixture is being inserted into the top of the cheese tower 10 to allow the cheese forming cycle to be repeated in a generally continuous manner.

From the foregoing, it will be appreciated that the invention provides a method and apparatus for producing precise weight portions of cheese 92 using a cheese tower system 1. The invention is not limited to the embodiments described hereinabove or to any particular embodiments. Various modifications to the processes and apparatus described above will result in substantially the same invention. While the method and apparatus described above are believed to be useful for high speed commercial production of natural cheese, they may also be useful, with some variation as to ingredients and process parameters, for production of process cheese, process cheese food, cheese spread, cream cheese, and other food products.

The invention is defined more particularly by the following claims:

1. A method for producing precise quantities of cheese, the method comprising:

forming a column of cheese in a tower;

cutting a first quantity of cheese from the column;

determining the weight of the first quantity of cheese cut from the column; and cutting a second quantity of cheese from the column, the second quantity of cheese being sized according to the weight of the first quantity of cheese.

2. The method for producing precise quantities of cheese according to claim 1, including using a guillotine blade positioned below an end of the cheese tower to cut the first and second quantities of cheese from the column of cheese.

3. The method for producing precise quantities of cheese according to claim 2, including supporting an end of the column of cheese on a sizing gate positioned below the tower and below the guillotine blade.

4. The method for producing precise quantities of cheese according to claim 3, including adjusting the spacing between the sizing gate and the guillotine blade to vary the vertical dimension of the cheese column between the sizing gate and the guillotine blade.

5. The method for producing precise quantities of cheese according to claim 4, including retracting the sizing gate after the first quantity of cheese has been cut to remove the quantity of cheese from the sizing gate.

6. The method for producing precise quantities of cheese according to claim 5, including depositing the first quantity of cheese on a conveyor having an intermeshing weighing grid disposed therebelow.

7. The method for producing precise quantities of cheese according to claim 6, including lowering the conveyor so that the intermeshing weighing grid weighs the first quantity of cheese.

8. The method for producing precise quantities of cheese according to claim 7, including raising the conveyor after the first quantity of cheese has been weighed to enable the conveyor to transfer the first quantity of cheese.

9. The method for producing precise quantities of cheese according to claim 8, including comparing the weight of the first quantity of cheese with an ideal weight range to determine whether the weight of the first quantity of cheese is within the weight range.

10. The method for producing precise quantities of cheese according to claim 9, including decreasing the spacing between the sizing gate and the blade if the weight of the first quantity of cheese is greater than the ideal weight range.

11. The method for producing precise quantities of cheese according to claim 9, including increasing the spacing between the sizing gate and the blade if the weight of the first quantity of cheese is less than the ideal weight range.

12. A cheese tower for producing precise quantities of cheese in a substantially continuous process, the cheese tower comprising:

means for forming a column of cheese in the cheese tower;

means for cutting a first quantity of cheese from the column of cheese;

means for weighing the first quantity of cheese;

means for adjusting the size of a second quantity of cheese to be cut from the column of cheese after the first quantity of cheese has been cut therefrom.

13. A cheese production system for producing precise quantities of cheese in a substantially successive manner, the system comprising:

a cheese tower for forming a column of cheese;

a blade positioned proximate a bottom end of the cheese tower for cutting a quantity of cheese from the column of cheese emerging from the bottom end of the cheese tower;

a weighing apparatus disposed beneath the bottom end of the cheese tower for weighing the quantity of cheese; and a feedback mechanism effective to adjust the size of subsequent quantities of cheese cut from the tower based upon the weight of the preceding quantity of cheese.

14. The cheese production system according to claim 13, wherein a sizing gate is positioned below the bottom end of the cheese tower for receiving the column of cheese emerging from the tower.

15. The cheese production system according to claim 14, wherein the distance between the sizing gate and the blade is adjustable to control the size of the quantities of cheese cut from the column of cheese.

16. The cheese production system according to claim 14, wherein the weighing apparatus comprises a weighing grid having a plurality of fingers for supporting the quantity of cheese.

17. The cheese production system according to claim 16, wherein a receiving conveyor is disposed beneath the bottom end of the cheese tower for receiving the quantity of cheese and transporting the quantity of cheese.

18. The cheese production system according to claim 17, wherein the elevation of the receiving conveyor is adjustable between an upper position for receiving the quantity of cheese and a lower position for weighing the quantity of cheese.

19. The cheese production system according to claim 18, wherein in the lower position the fingers of the weighing gird support the quantity of cheese for weighing the cheese.

20. The cheese production system according to claim 19, wherein the conveyor has an intermediate position between the upper and lower conveyor positions for transporting the cheese away from the cheese tower.

* * * * *